(12) United States Patent
Waldl (10) Patent No.: US 10,931,924 B2
(45) Date of Patent: Feb. 23, 2021

(54) METHOD FOR THE GENERATION OF A CORRECTION MODEL OF A CAMERA FOR THE CORRECTION OF AN ABERRATION

(71) Applicant: B&R INDUSTRIAL AUTOMATION GMBH, Eggelsberg (AT)

(72) Inventor: Andreas Waldl, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/385,614

(22) Filed: Apr. 16, 2019

(65) Prior Publication Data
US 2019/0327454 A1 Oct. 24, 2019

(30) Foreign Application Priority Data
Apr. 18, 2018 (EP) .................................... 18168054

(51) Int. Cl.
*H04N 9/04* (2006.01)
*G06T 7/80* (2017.01)
(Continued)

(52) U.S. Cl.
CPC ......... *H04N 9/04517* (2018.08); *G06F 17/16* (2013.01); *G06T 5/006* (2013.01); *G06T 7/80* (2017.01)

(58) Field of Classification Search
CPC ....... H04N 9/04517; G06T 7/80; G06T 5/006; G06F 17/16
See application file for complete search history.

(56) References Cited

U.S. PATENT DOCUMENTS

2017/0032537 A1\* 2/2017 Li ............................. G06T 7/80
2017/0070731 A1 3/2017 Darling et al.
(Continued)

FOREIGN PATENT DOCUMENTS

WO 2018/050223 3/2018

OTHER PUBLICATIONS

R. Hartley et al., *Multiple View Geometry in Computer Vision*, Cambridge Univ. Press, $2^{nd}$ Ed. (2003).
(Continued)

*Primary Examiner* — Nicholas G Giles
(74) *Attorney, Agent, or Firm* — Greenblum & Bernstein, P.L.C.

(57) ABSTRACT

To correct aberrations in the image plane of a camera while modifying selected, modifiable camera settings that influence aberrations quickly and simply, a plurality of features with different known feature positions is provided in space. For each selected, modifiable camera setting influencing the aberration, at least two defined setting specifications are provided for modifying respective camera settings. For each setting specification, the camera captures the plurality of features. The camera determines positions of features in the image plane. Via a known mathematical method, a connection between different known feature positions in space and corresponding image positions in the image plane of the camera is determined. For each of the setting specifications of the selected modifiable camera settings, correction parameters of at least one mathematical correction model are determined for correcting the aberration. The at least one correction model is stored in the camera together with the determined correction parameters.

18 Claims, 4 Drawing Sheets

(51) Int. Cl.
*G06F 17/16* (2006.01)
*G06T 5/00* (2006.01)

(56) References Cited

U.S. PATENT DOCUMENTS

| | | | |
|---|---|---|---|
| 2018/0122099 A1* | 5/2018 | Lee | G06T 7/70 |
| 2019/0096090 A1* | 3/2019 | Hirai | H04N 5/23238 |
| 2020/0151908 A1* | 5/2020 | Zhang | G06T 7/00 |

OTHER PUBLICATIONS

Matsuoka et al., "Evaluation of Correction Methods of Chromatic Aberration in Digital Camera Images", *ISPRS Annals of the Photogrammetry, Remote Sensing and Spatial Information Sciences*, vol. 1-3 (2012).

Europe Office Action/Search Report conducted in counterpart Europe Appln. No. 18168054.7 (dated Sep. 26, 2018) (w/machine translation).

* cited by examiner

METHOD FOR THE GENERATION OF A CORRECTION MODEL OF A CAMERA FOR THE CORRECTION OF AN ABERRATION

CROSS-REFERENCE TO RELATED APPLICATIONS

The present application claims priority under 35 U.S.C. § 119(a) of European Patent Application No. 18168054.7 filed Apr. 18, 2018, the disclosure of which is expressly incorporated by reference herein in its entirety.

BACKGROUND OF THE INVENTION

1. Field of the Invention

The invention relates to a method for the generation of a correction model of a camera to correct at least one aberration influenced by a number of selected, modifiable camera settings in the image plane of the camera as well as the use of the method for the calibration of a camera.

2. Discussion of Background Information

In industrial image processing, one or more image acquisition devices, preferably cameras, may be used to perform vision system processes on an object or a surface within a depicted scene. These processes may comprise for example inspection tasks, an image or symbol decoding, the measuring of an object orientation, measurements of an object, or a number of other tasks. It is generally necessary to calibrate the camera, for example to allow the image processing system to perform tasks in a reproducible manner with increased precision and increased reliability.

If it is necessary to provide measuring results in the applications for industrial image processing, this is not possible without precision losses due to the aberrations that result from the lighting and/or the characteristics of the optical components of the camera, even if particular care was taken in the selection of the components and their influence on camera aberrations.

Since deviations between individual components of an industrial image processing system cannot always be minimized to a required level due to production technology issues, it may be necessary for some applications to decrease aberrations caused by these deviations to a minimum by means of a downstream correction.

To be able to complete a difficult task relating to the processing of images in a satisfactory manner, known and reproducible characteristics of the image acquisition system are absolutely necessary. Particularly if an exchange of individual components for a duplication of applications at different locations, or by a modification of specific camera settings, can change the characteristics and/or overall conditions of an image processing system, this generally leads to aberrations of the camera.

The aberrations are manifold. Inhomogeneities in the lighting of an object may be just as problematic as a vignetting (shading toward the edges of the image) that is caused by the optics of the camera or the mechanical design. The objectives that are used are responsible for many other aberrations as well and therefore for problems and deviations in the downstream image processing. Some aberrations can, in general, be corrected without any noteworthy loss of information, provided a sufficient quantity of data is available for the correction. While more complex mathematical methods are required for known aberrations such as a coma, astigmatism, spherical aberration, or image field curvature, corrections of equally known geometric aberrations such as the geometric distortion or the chromatic aberration are easy to control and have a broad application.

Certain modifiable camera settings such as the focal width, the aperture the optics use, and the wavelength of the light used to illuminate the object have a significant influence on the geometric aberrations.

SUMMARY OF THE EMBODIMENTS

Embodiments provide a method with which aberrations in the image plane of a camera can be corrected as quickly and easily as possible when selected, modifiable camera settings that influence the aberration are modified.

According to embodiments, the task is solved in that providing a plurality of features with different known feature positions in space, that for each of the selected, modifiable camera settings that influence the aberration at least two defined setting specifications are provided for the modification of the respective camera setting, that for each of the at least two provided setting specifications the plurality of features is captured by the camera, that image positions of the features in the image plane are determined by the camera from the captured features, that at least by means of one known mathematical method a connection is determined between the different known feature positions in space and the corresponding image positions in the image plane of the camera, that from that, for each of the at least two provided setting specifications of the selected, modifiable camera settings correction parameters of at least one specified mathematical correction model are determined for the correction of the at least one aberration and that the at least one correction model is stored in the camera together with the determined correction parameters.

Preferably, the aberration provided is a geometric distortion and/or a chromatic aberration and/or a vignetting. These aberrations are influenced by the selected modifiable camera settings of the camera and can be corrected with the present method.

Preferably, the modifiable camera settings influencing the aberration that are provided are a focal width and/or a focal distance and/or an aperture and/or a wavelength of a light of an illumination of the features. Thereby, the most important modifiable camera settings are taken into consideration that influence one or more aberrations.

It is preferable if an equal camera distance from the image plane is provided for all features, whereby the features are preferably arranged on a two-dimensional calibration plate as active or passive, preferably circular features. It is preferred here if the camera distance of the calibration plate is changed at least twice, whereby at each camera distance the features for each of the at least two provided setting specifications are captured by the camera. By using a two-dimensional calibration plate with preferably modifiable camera distance, the practical application of the method is made easier.

According to a further preferred embodiment, at least two features are provided with a different camera distance, whereby the features are preferably arranged on a three-dimensional calibration object as active or passive, preferably circular features. Thereby, even a three-dimensional calibration object may be used on which the features are arranged at different camera distances, whereby the method can be made even easier. This is particularly preferable when for example the determination and modification of the camera distance of a two-dimensional calibration plate is difficult or imprecise.

It is advantageous if at least 10, preferably at least 20, and even more preferably at least 30 features are provided, whereby the features are preferably arranged on the three-dimensional calibration object or on the two-dimensional calibration plate. This way, a sufficient number of features are present and a good quality of the error correction is reached.

Preferably, a pinhole camera model according to Hartley and Zisserman is used as the mathematical method used for the determination of the connection between the different known feature positions in space and the image positions in the image plane of the camera. Preferably, a radial-tangential model according to Brown-Conrady is used as the correction model for the geometric distortion and/or the chromatic aberration, and a radial vignetting function with vignetting parameters and a pixel intensity is preferably used as the correction model for the vignetting. These models are already successfully used in prior art and deliver good results.

One preferred use of the method provides that in a setting specification of one of the selected camera settings influencing the camera settings deviating in one of the at least two defined setting specifications, the correction parameters of the correction model for the correction of the at least one aberration are calculated at this deviating setting specification from the determined correction parameters of the at least two defined setting specifications, that the calculated correction parameters for the deviating setting specification are stored in the correction model of the camera for the correction of the at least one aberration in the deviating setting specification, and that the correction model with the calculated stored correction parameter is used to correct the at least one aberration in the image plane of the camera at the setting specification deviating from the at least two defined setting specifications. This way, a camera may, when in operation, be adapted to required overall conditions and aberrations may be corrected in setting specifications that were not taken into account during the determination of the correction parameters.

Preferably, the correction parameters for the deviating setting specification are calculated by means of a hyperbole function and linear interpolation or linear regression from the correction parameters of the at least two defined setting specifications. This makes it possible to obtain sufficiently good results with simple mathematical methods.

BRIEF DESCRIPTION OF THE DRAWINGS

The present invention is explained in further detail below with references to FIGS. 1 to 4, which show preferred embodiments of the invention in an exemplary, schematic, and nonlimiting manner.

DETAILED DESCRIPTION OF THE EMBODIMENTS

Figure 1:
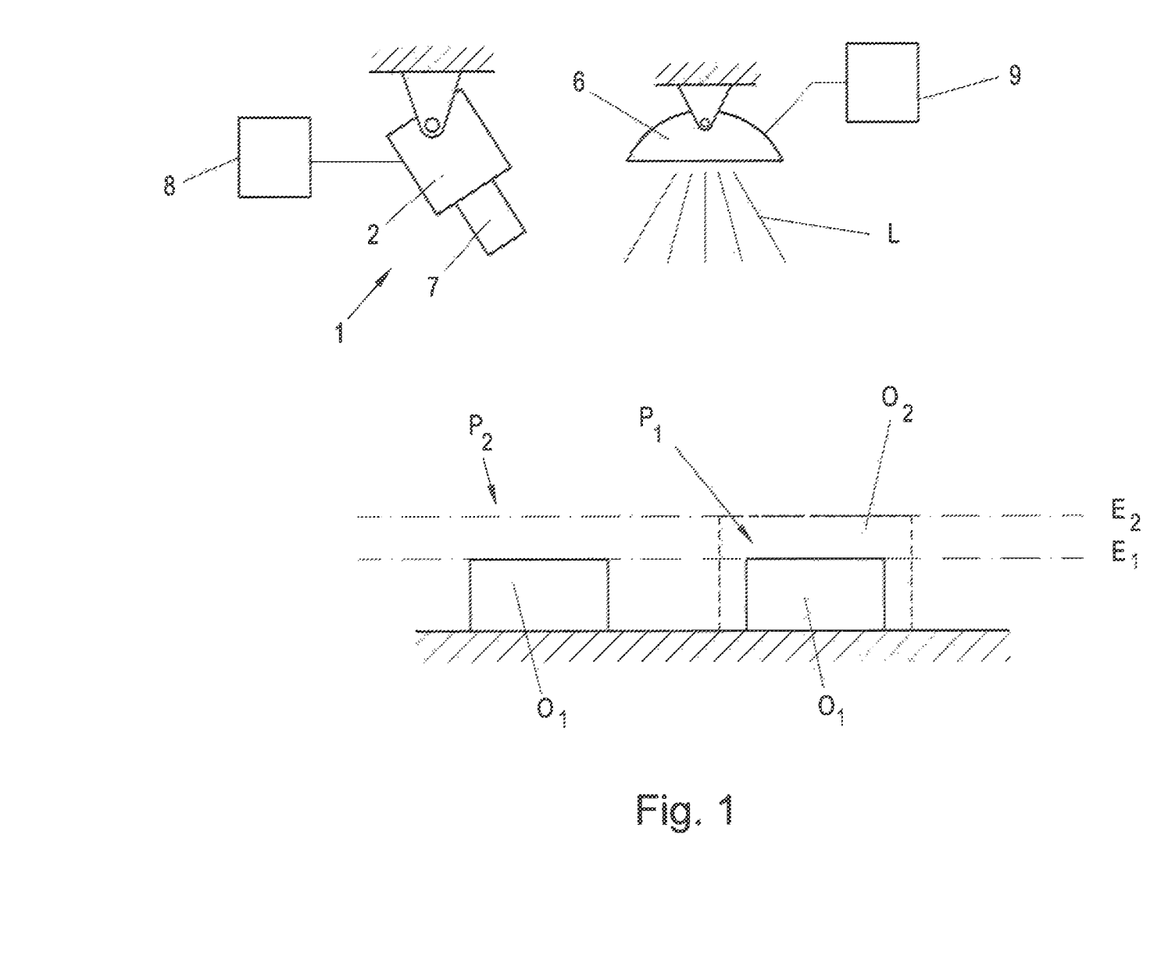
FIG. 1 shows an exemplary illustration of an industrial image processing system.

FIG. 1 shows an exemplary illustration of an industrial image processing system 1 in a measurement application of an object $O_1$. The image processing system 1 comprises a camera 2 and one or more lighting units 6 that are integrated in the camera, or external, and that are arranged in space in a stationary manner, for example on a suitable retaining device (not shown). The camera 2 is positioned so that the object $O_1$ to be measured is in the capture range of the camera 2 and so that the camera can capture images of the object $O_1$. The images are processed for example in a suitable evaluation unit 8, preferably to provide a measurement result of the object $O_1$ to be measured. A measuring task could be, for example, the detection of certain features in a measuring plant E1 on the object $O_1$ or also an actual measurement of the dimensions of the object $O_1$ or components or the like arranged on it.

The lighting unit 6 illuminates the object $O_1$ to be measured in the capture area of the camera 2. In industrial image processing, preferably cameras 2 with monochrome image sensors are used, but the method according to the invention may also be used for cameras 2 with color sensors. The light L of the illumination has certain characteristics, for example a certain wave length $\lambda$, a certain light strength, etc. Generally, but not necessarily, monochrome light L in the visible range but also in the ultraviolet (UV) or infrared (IR) range is used for the illumination. Monochrome means that the wavelength $\lambda$ of the light L is limited to the tightest possible wavelength band around a defined wavelength $\lambda$, ideally a specific wavelength $\lambda$, i.e., UV light or unicolor visible light L. If white light L, i.e., light L with various different wavelengths $\lambda_i$ is used for the illumination, monochrome errors can be corrected with a color and/or hyperspectral sensor of the camera 2 only on the pixels with the respective filters.

The invention is described below with the help of a camera 2 with a monochrome image sensor. Depending on the surrounding condition of the overall image processing system 1, the lighting unit 6, or an illuminant arranged therein, even illumination cannot always be guaranteed, which may lead to an aberration of the camera 2. The optical system of the camera 2 itself may lead to aberrations as well, for example, a geometric distortion, a chromatic aberration, or a vignetting. The lighting unit 6 may also be controlled with an appropriate light controller 9, for example to balance fluctuations of the light strength or to realize a flashlight. Aberrations may cause the dimensions on the image taken of the object $O_1$ by the camera 2 not to correspond to the actual dimensions of the object $O_1$ or may cause the object not to be shown exactly as it is in reality. Depending on the extent of the aberration, measurement imprecisions may occur in particular in precise measuring tasks that distort the measuring result so much that it can no longer be used.

Not only the lighting or the optical system play a role, however, but also, for example, the distance and angle between the camera 2 and the object $O_1$ to be measured or the settings of the camera 2 or of a lens 7 such as the aperture or the focal width. The position of the object $O_1$ may change for example from a first measuring position $P_1$ to a second measuring position $P_2$, or a larger object $O_2$ is used. In the example shown, this would cause the angle and the distance of the camera 2 from the measuring plane $E_1$ of the object $O_2$ or the measuring plane $E_2$ of the object $O_2$ to change as well, which might lead to an aberration, for example a geometric distortion.

Generally, a significant effort is made, in particular regarding measuring tasks, to keep the overall conditions of the image processing system 1 (angle, distance, light strength, wavelength of the light, aperture setting, focal width, etc.) as constant as possible and to calibrate the camera 2 in such a way that no or as few aberrations as possible are caused or that the aberrations are minimized. Here, to calibrate means that certain overall conditions are specified and that the camera 2 is calibrated exactly for these specified overall conditions. This can be done for example with known algorithms which are carried out for example in a control unit in the camera 2 or in the evaluation unit 8 of the camera 2.

The calibration is generally based on calibration data for the specified overall conditions, which is used to compensate for the aberrations. Since such a calibration generally requires a great deal of effort and in particular because it applies only to the exact overall conditions that the calibration is based on, the flexibility of such an image processing system 1, for example when mounted on a robotic arm, is very limited. In such traditional image processing systems 1, a new calibration of the camera 2 must be performed each time the overall conditions change so as to be able to ensure correct measuring results. The method according to the invention addresses these disadvantages, as described in detail below on the basis of FIG. 2.

Figure 2:
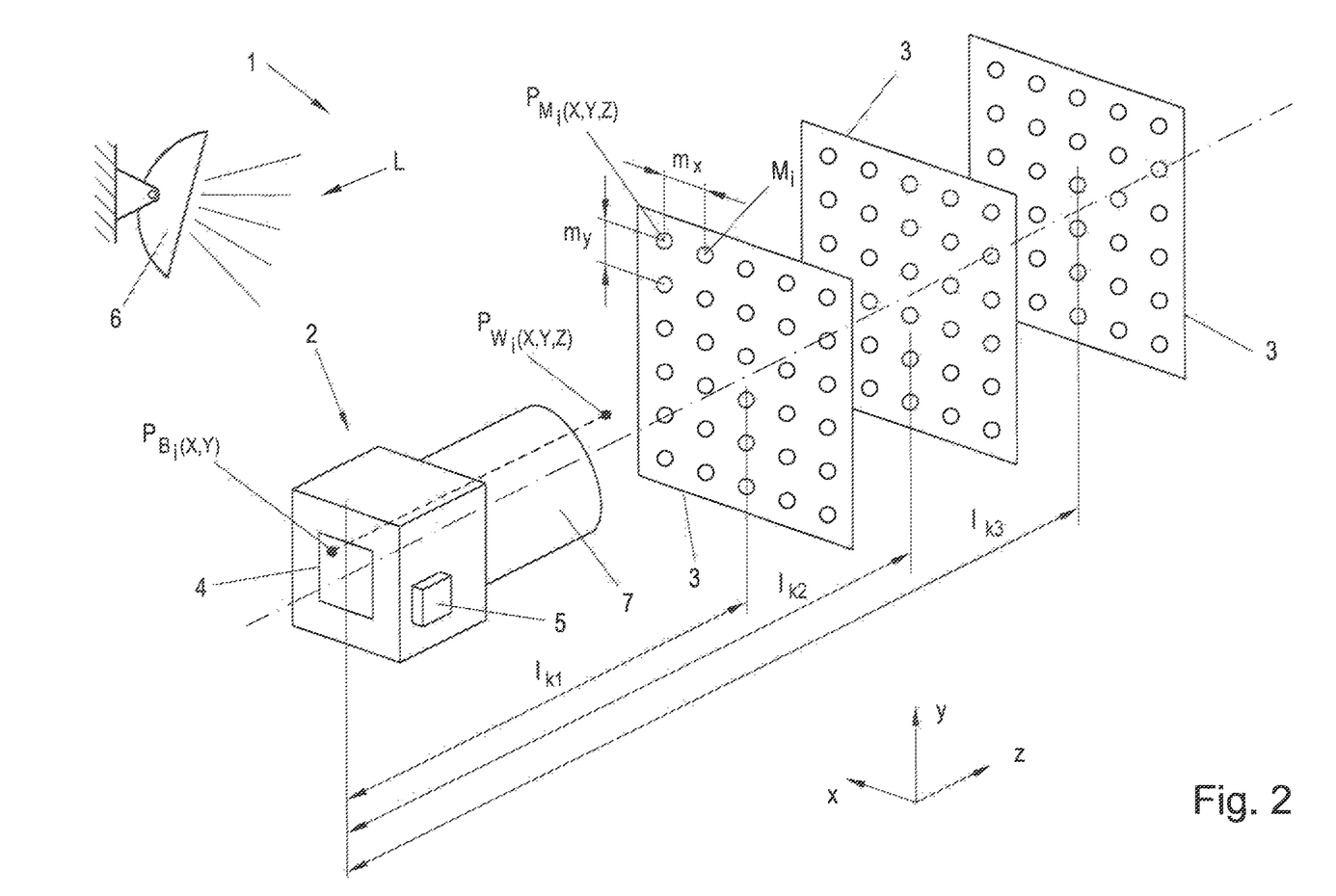
FIG. 2 shows an assembly for the calibration of a camera of an industrial image processing system with a camera and a calibration object, FIGS. 3A and 3B each show an example of an aberration of the geometric distortion.

FIG. 2 shows an industrial image processing system 1 in a coordinate system formed by an X-axis, a Y-axis and a Z-axis in space with a camera 2 comprising a lens 7 and a calibration object 3 in which a certain number of features M can be captured and analyzed by the camera 2. To obtain a required spatial depth, the camera 2 in the example shown is, for the calibration in the Z-direction, adjustably arranged to the calibration object 3 in a translational vertical manner and the calibration object 3 is arranged in a stationary manner.

This makes it possible to change a camera distance $l_K$ of the camera 2 from the calibration object 3. The reverse may be the case as well, i.e., a stationary camera 2 and a calibration object 3 with a position that is translationally changeable in the Z-direction. Due to the changeable camera distance $l_K$, a two-dimensional calibration object 3 may be used, a so-called two-dimensional calibration plate. To move the camera 2 in the Z-direction, the camera 2 may be mounted for example on a linear rail (not shown). The size of the calibration plate is preferably specified so that even at a minimum camera distance $l_K$ of the calibration plate, the camera 2 still covers the entire calibration plate with all features M.

The starting position of the camera 2 may be chosen at random, but it is important that the translation of the camera 2 in the Z-direction is reproducible and that the distance differences of the individual camera distances $l_K$ are known as precisely as possible, which is possible without great effort. It is also important that the calibration plate is oriented as precisely as possible at a right angle to the camera to ensure that the distances of the features M in the Z-direction from the camera 2 do not differ at a certain camera distance $l_K$. This can be ensured by means of the construction of the calibration assembly. The calibration plate is illuminated by a suitable lighting unit 6 as homogeneously as possible with preferably monochromatic light L.

Figure 3A:
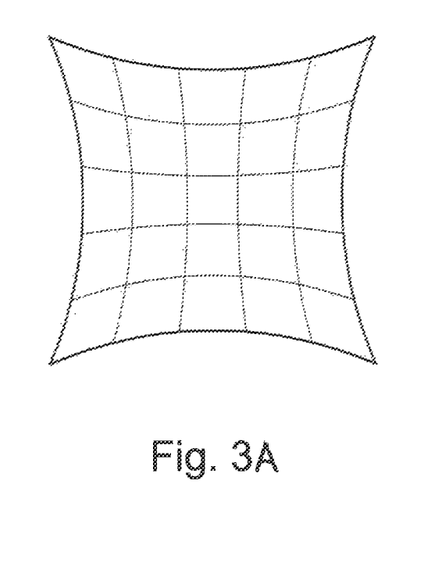
Figure 3B:
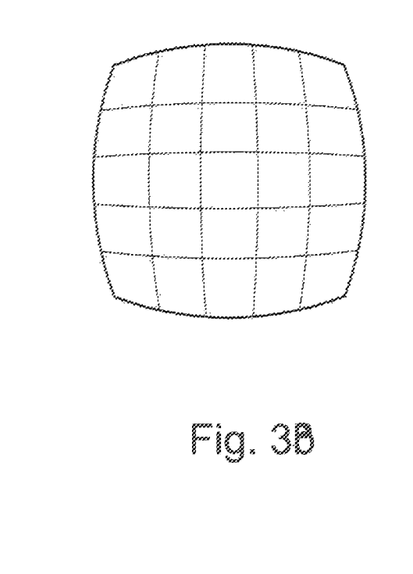

When the camera 2 captures an image from a real point in space, a so-called world-point $P_{W(X,Y,Z)}$, a corresponding image point $P_{B(X,Y)}$ is generated on an image plane 4 of the camera 2. The camera 2 has a specific number of modifiable camera settings such as a focal width, a focal distance F, an aperture B, or a known wavelength λ of the light L of an illumination with which an object to be captured, in the specific case the calibration object 3, here a calibration plate, is illuminated. With an active calibration plate, however, the features M themselves can illuminate with light L of the known wavelength λ. These modifiable camera settings generally cause aberrations in the image plane 4 of the camera 2 due to the physical behavior of the optical components of camera 2. Such aberrations are, for example, a geometric distortion, a vignetting, or a chromatic aberration. The characteristics, causes, and the effects of these aberrations are known, which is why they are not addressed here in detail. A geometric distortion, for example, causes the positions of the image points $P_{B(X,Y)}$ that are captured in the image plane 4 of the camera 2 not to correspond to the real positions of the world-points $P_{W(X,Y)}$, which leads to a pillow-shaped distorted image as shown in FIG. 3A or a drum-shaped distorted image as in FIG. 3B.

In some applications, for example in traditional photography, such aberrations are accepted or even desired up to a certain degree, such as in art photography. In industrial image processing systems 1, aberrations are generally undesired, however, because particularly in measurement applications the measurement results would be distorted because an object O shown in the image plane 4 of the camera 2 is distorted. A measured distance or a measured position would, for example, not correspond to the actual distance to be measured on the object O or the real position of the object O.

It is therefore preferable to minimize or even compensate for these aberrations with as little effort and as simply as possible. Mathematical methods for the correction of the aberrations are generally known from prior art and can be used to calibrate the camera 2 for a certain specified camera setting or a specified combination of a number of camera settings. The practical application is problematic, however, particularly when one or more camera settings of the camera 2 are modified, e.g., when the focal distance F or the camera 2 changes or when the wavelength λ of the light L of the illumination changes. In traditional calibration processes, the camera 2 would have to be recalibrated after every modification of a camera setting to be able to provide suitable measuring results, which is very time intensive and therefore undesired.

The calibration object 3 in the example shown in FIG. 2 is a two-dimensional, passive, plane calibration plate and has a plurality i of features $M_i$, which are arranged in a defined grid with known feature positions $P_{Mi(X,Y)}$ on the calibration plate. Passive means that the calibration plate must be illuminated by a suitable lighting unit 6. The illumination should be as even as possible across the entire surface of the calibration plate. In an active calibration plate, the individual features M themselves should illuminate as homogeneously as possible with light L of a specific wavelength λ.

Plurality in this context means at least a number greater than one. In the example shown, for example, twenty features M are provided on the calibration plate. In general, the precision of the method according to the invention is increased the higher the number of features M is, but the number of the features should not be too high either because that would make the duration of the process longer, which is undesirable. Preferably, however, at least twenty features M are provided on the calibration plate, and especially preferable being at least thirty features, because this amount achieves a substantially good result and any further increase of the number of feature M would only result in slight precision increases.

Preferably, the features M are, as in the example shown, formed as light circles on a dark background with as little reflection as possible so as to guarantee a high contrast. The circles are arranged on the calibration plate at equal distances $m_X$, $m_Y$ from each other. The features M may also be arranged in a different form such as the form of a chessboard pattern and have different distances from each other. What is important is that the feature positions $P_{Mi(X,Y)}$ of the individual features $M_i$ are specified as exactly as possible on the calibration plate (the index i refers to the number of features M).

Regarding the definition of the feature position $P_{Mi(X,Y,Z)}$ in space, it is necessary to determine the third coordinate, here that of the camera distance $l_K$ in the Z-direction, as accurately as possible. Light circles on a dark background with little reflection have the advantage that the positions of the circles, i.e., the feature positions $P_{Mi(X,Y,Z)}$, can be reliably determined even for blurry images. That is important because different image settings for the sharpness may be used for the determination of the correction parameters (as described below) without changing the camera distance $l_K$, provided the camera 2 has a correspondingly modifiable camera setting (modifiable focal distance F). The lighting unit 6 should illuminate the circles as homogeneously as possible.

In the case of a passive calibration plate, features M must be actively illuminated by a suitable lighting unit 6. Alternatively, however, an active calibration plate or an active three-dimensional calibration object 3 with active features $M_i$ could be used. Active features M are not illuminated by a lighting unit 6, but actively emit light to signal their position. Active features $M_i$ may be configured as point-shaped light-emitting diodes (LED). What is important here is that a homogenous light, preferably circular depiction, is achieved in the image. To this purpose, the LEDs could be recessed in holes on the calibration plate, for example, with a diffusing screen arranged above it. The light source could also consists of LCD, TFT, or other passive or active elements as they are used in the development of displays; e.g., a monochrome luminescent organic light-emitting diode (OLED) has the advantage to be a very homogeneous source of light across a given surface.

The use of the two-dimensional calibration plate as a calibration object 3 is only optional, however; it is possible to use a three-dimensional calibration object 3 as well on which the features $M_i$ are arranged, hereby at least two features $M_i$ have a different camera distance $l_K$. It is also possible, however, to use a single feature $M_i$ the position of which can be changed in space. A three-dimensional calibration object 3 has the advantage, for example, that the position of the camera 2 does not have to be changed relative to the three-dimensional calibration object 3 (=camera distance $l_K$) (or vice versa).

The method according to the invention is described below on the basis of the determination of a correction model for the correction of three aberrations for two modifiable camera settings at three different camera distances $l_K$. The three aberrations are the geometric distortion, the chromatic aberration, and the vignetting, and the two modifiable camera settings are the wavelength λ of the light L of the illumination and the focal distance F. Of course, however, the method is not limited to the exemplary embodiment shown. It would also be possible to correct only one aberration by modifying just one camera setting (e.g., just aperture B or only the focal distance F) or to correct a number of aberrations while modifying several camera settings at the same time. In can be said in general that the more camera settings are modified and the more aberrations are corrected, the greater the effort required to perform the method according to the invention.

According to the invention, at least two defined setting specifications are provided for the modification of the respective camera setting, and for each of the setting specifications provided, camera 2 captures an image of the plurality of features $M_i$ with different known feature positions $P_{Mi(X,Y,Z)}$ in space. In the specific example, the wavelength λ of the light L is modified three times and the focal distance F is modified three times as well. In addition, the camera distance $l_K$ is modified three times in the example shown, and for every camera distance $l_{K1}$, $l_{K2}$, $l_{K3}$ as shown in FIG. 1, every wavelength $λ_1$, $λ_2$, $λ_3$, and every focal distance $F_1$, $F_2$, $F_3$, the camera 2 captures an image of each of the features $M_i$ arranged on the calibration plate. The setting specifications therefore pertain here to three different values of the wavelength λ and three different values of the focal distance F. Green light is used for example as wavelength $λ_1$, blue light as wavelength $λ_2$, and red light as wavelength $λ_3$, which is generated by a suitable monochromatic illumination. It is not necessary to use visible light L; ultraviolet (UV) or infrared (IR) light L may be used as well.

Overall, therefore, the camera 2 captures in this example 27 images of the twenty features $M_i$. The first camera distance $l_{K1}$ may be chosen at two-thirds of a focal distance F (⅓ before focus), the third camera distance $l_{K3}$ at five-thirds of a focal distance F (⅔ after focus), and the second camera distance $l_{K2}$ in the center between these two camera distances $l_{K1}$, $l_{K3}$. This arrangement has the advantage that no strongly defocused images are taken, which leads to easier lighting conditions and sharper pictures, which, in turn, makes a more precise determination of the feature positions $P_{Mi(X,Y,Z)}$ in the image plane 4 easier.

Preferably, at least two setting specifications are selected for each camera setting, but particularly preferably three setting specifications each, as shown in the exemplary embodiment. The result is only slightly improved when more than three focal distances F are used. In general, and similar to the number of features $M_i$, the principle applies that the greater the number of the setting specifications of a camera setting is, the more precise the result of the correction will be (albeit with an only slight improvement), but the greater the time spent on this will be as well. The selection of the number of features $M_i$ and the number of the setting specifications is preferably selected in the practical application so that both precision requirements are met and that time limits are adhered to. Preferably, precisely three setting specifications per modifiable camera setting and between twenty and forty features $M_i$ are used.

From the images captured, the camera 2 determines, for example by means of a suitable computing unit 5, which is integrated in the camera 2, or arranged externally, the feature positions $P_{Mi(X,Y)}$ in the image plane 4, i.e., the image points $P_{Bi}$. In the example shown, the center points of the circular features $M_i$ are determined for this purpose. By means of at least one known mathematical method, a connection between the different known feature positions $P_{Mi(X,Y,Z)}$ in space, i.e., the world-points $P_{Wi}$ and the corresponding image points $P_{Bi(X,Y)}$, i.e., the measure feature positions $P_{Mi(X,Y)}$ in the image plane 4 of the camera 2, the so-called point correspondences, are determined (the index i relates to the number of features $M_i$. The feature positions $P_{Mi(X,Y,Z)}$ in space are, as described, defined by the known arrangement of the features $M_i$ on the calibration plate and by the camera distance $l_{Kj}$ in the Z-direction (the index j stands for the number of the modifiable camera distances $l_K$). Preferably, the known pinhole camera model by Hartley & Zisserman is used for the determination of the connection or other suitable mathematical models.

$P_{Bi(X,Y)}=P*P_{Wi(X,Y,Z)}$ with the projection matrix $P=K*[R|-C]$ which can, in turn, be divided into a 3×3 calibration matrix K with $$K = \begin{bmatrix} f_X & s & c_X \\ 0 & f_Y & c_Y \\ 0 & 0 & 1 \end{bmatrix},$$

a 3×3 rotation matrix R and a translation vector C. The parameters of the calibration matrix K are a horizontal and a vertical focal width $f_X$, $f_Y$, a skew s (which takes into consideration a potential deviation of the image plane 4 from the right angle) and the coordinates of a main point $C_X$ and $C_Y$. In the pinhole camera model an optical axis is drawn through the hole (center of projection) perpendicular to the image plane 4. The main point C is located where the optical axis intersects with the image plane 4. This easy connection is also used in an actual camera 2 with a lens 7 although the optical axis is determined by the lens 7. If the lens 7 is not perfect, it may be possible that this optical axis does not stand exactly vertically in the image plane 4. This results in an affine shearing of the image coordinate system (deviation of 90°) and is modeled in the calibration matrix K by the parameter skew s which should be zero in the ideal case. The calibration matrix K describes all linear, intrinsic parameters of the camera 2, also referred to as the inner orientation of a camera 2. The rotation matrix R and the translation vector C describe the extrinsic parameters, the "outer orientation," i.e., the translation and rotation between the camera coordinates in the image plane 4 of the camera 2 and the world-coordinates of the features in the plane on the calibration plate (X, Y-axis) and/or in space (Z-axis). The projection matrix P therefore assigns a unique image point $P_{Bi(X,Y)}$ to a world-point $P_{Wi(X,Y,Z)}$. It should be noted, however, that this is not the case in the reverse. An image point $P_{Bi(X,Y)}$ always represents a ray. In the case of a calibrated camera 2, it is possible to measure the directions of rays and determine the angle between rays, but it is not possible to determine the actual distance of the respective world-point $P_{Wi(X,Y,Z)}$ from the camera 2. Since the pinhole camera model is known from prior art, we will not address it in further detail here but reference the publication [R. Hartley and A. Zisserman. *Multiple View Geometry in Computer Vision*. Cambridge University Press, 2$^{nd}$ edition, 2003].

In the example below, the following radial-tangential correction model according to Brown-Conrady is used for the correction of the distortion, but it is possible to use a different suitable model as well. $X_d=(X_d;Y_d)^T$ refers to the coordinates of the recorded image point, $P_{Bi}$, $X_u=(X_u;Y_u)^T$ to the coordinates of the unrecorded image point $P_{Bi}$ and $X_c=(C_x;C_y)^T$ to the coordinates of the main point C in the image plane 4. The calculation is performed by means of a radius r, radial parameters $r_1$, $r_2$, $r_3$ and tangential parameters $t_1$ and $t_2$. First, the origin of the image coordinate system is moved into the main point C. There is no distortion in the main point C (and no chromatic aberration either). The distortion is now modeled to the main point C (radius r) by means of the distance. The radial parameters $r_i$ model a radial displacement of an image point $P_{Bi}$. The image point $P_{Bi}$ is depicted either too close or too far away from the main point C. The corrected undistorted image point $P_{Bi}$ is then precisely in the right place. In the same way, the tangential parameters $t_i$ model a tangential displacement of an image point $P_{Bi}$. It would also be possible to add higher orders both for the radial parameters $r_i$ and for the tangential parameters $t_i$, but due to the insignificant influence, this was refrained from.

$$r=\sqrt{(X_u-C_X)^2+(X_u-C_Y)^2)}$$

$$X_d=X_u(1+r_1r^2+r_2r^4+r_3r^6)+2t_1X_uY_u+t_2(r^2+2X_u)^2$$

$$Y_d=Y_u(1+r_1r^2+r_2r^4+r_3r^6)+t_1(r^2+2Y_u)^2+2t_2X_uY_u$$

A complete, geometrically correct determination of all camera parameters (calibration matrix K, radial parameters $r_i$, tangential parameters $t_i$) requires an initial estimation followed by an iterative minimization of a degree of error, here the reprojection error. When the camera 2 is calibrated and the location of feature $M_i$ on the calibration object 3 is known (world-point $P_{Wi(X,Y,Z)}$), these world-points $P_{Wi(X,Y,Z)}$ can mathematically be projected in the image plane 4. No matter how good the calibration is, however, a deviation between a world-point $P_{Wi(X,Y,Z)}$ projected in the image plane 4 (image point $P_{Bi}$) and the actual depiction of the world-point $P_{Wi(X,Y,Z)}$ in the real camera image will occur. The distance between the real point and the projected point in space-time $P_{Wi(X,Y,Z)}$ (image point $P_{Bi}$) is the reprojection error.

In the iterative minimization, the error for many points is minimized as a whole, whereby the calibration of the camera 2 is iteratively improved. To avoid a reciprocal influencing between the coordinates of the main point C ($C_x$, $C_y$) and the tangential parameters $t_1$ of the lens distortion, it is advantageous to omit the tangential parameters $t_i$. On the one hand, the influence of the tangential parameters $t_i$ on the geometric distortion is much less than any of the radial parameters $r_i$, and on the other hand, a robust estimation of the main point C is required as well for a correction of the chromatic aberration, the vignetting, and for an interpolation of the parameters in relation to a setting specification that deviates from the defined setting specification of a camera setting (in the specific example, these are the wavelength λ of the light L of the illumination and the focal distance F). The influence of the skew parameter s is generally low, but its consideration is conceivable and would only require an additional multiplication.

To correct the chromatic aberration, the calibration plate is illuminated in the example shown with monochromatic red, green, and blue light (wave length $\lambda_1$, $\lambda_2$, $\lambda_3$). The knowledge about the monochromatic lighting can be used for the correction of the chromatic aberration. This can be done for example by means of the point correspondences obtained from the model according to Hartley & Zisserman or by means of the correction model of geometric distortion (here the radial-tangential model according to Brown-Conrady), i.e., by calculating three independent sets of the inner camera parameters ($K_i$, $r_i$ and optionally $t_i$) each for red, green, and blue lighting (wavelength $\lambda_1$, $\lambda_2$, $\lambda_3$). Since this method is generally known, reference is made here to the publication [Ryuji Matsuoka, Kazuyoshi Asonuma, Genki Takahashi, Takuya Danjo, and Kayoko Hirana. Evaluation of correction methods of chromatic aberration in digital camera images. *ISPRS Photogrammetric image analysis*, 3:25, 2012].

The effect of the vignetting is caused by various influences. A separation is generally made between natural vignetting (due to the incidence angle), pixel vignetting (due to the camera sensor), optical vignetting (due to blocked light paths within the optic), and mechanical vignetting (blocked light paths due to other camera elements such as filters). The vignetting has a radial characteristic and can be addressed by a radial correction model that starts from the main point C. This makes it possible to develop a vignetting function V(r), which is dependent on the radius r. The radius r is determined in the same way as in the distortion. The new corrected pixel intensity $I_{korr}$ for the correction of the vignetting is obtained by multiplying the intensity I of a pixel with the result of the vignetting function V(r).

$$V(r)+1+\alpha_1 r^2+\alpha_2 r^4+\alpha_3 r^6 \ldots$$

$$I_{korr}=V(r)*I$$

From the point correspondences that are determined, a calibration matrix K can be obtained for each feature $M_i$ at every setting specification of every camera setting and every camera distance $l_K$, in the example shown therefore a calibration matrix K for each of the twenty features $M_i$ at each of the three camera distances $l_{K1}$, $l_{K2}$, $l_{K3}$, each of the three wavelengths $\lambda_1$, $\lambda_2$, $\lambda_3$ of the monochromatic lighting, and each of the three focal distances $F_1$, $F_2$, $F_3$. The calibration matrix K may, for example, be determined by means of the known Direct Linear Transform (DLT) algorithm, whereby preferably, in order to improve the result, an iterative optimization of the calibration matrix K is performed, for example by means of the known Levenberg-Marquardt algorithm. Here, the determination of the nonlinear parameters $r_1$ and $r_2$ of the distortion must here be added to the parameters of the calibration matrix K.

As a consequence of the use of monochromatic lighting, a wavelength $\lambda_1$, $\lambda_2$, $\lambda_3$ can clearly be assigned to the parameters that were determined. By correcting the geometric distortion of each wavelength $\lambda_1$, $\lambda_2$, $\lambda_3$, the implicit result is a correction of the chromatic aberration. Generally, the measurable error is, due to the chromatic aberration, much smaller than the error of the geometric distortion, which is why the third term $(r_3*r^6)$ is not necessary. Errors of the chromatic aberration are generally, however, much more visible, and foregoing the third term $(r_3*r^6)$ would have a more significant effect here. Preferably, the correction occurs in a first step without the first term, but if a higher correction precision is desired, an adaptation by the third term or a suitable optimization method may be used which minimizes the various point distances between the chosen wavelengths $\lambda_i$.

For the correction of the vignetting, the parameters $\alpha_i$ are determined from the formula above. These parameters change with the modification of the camera settings such as the aperture B. In the example shown, the aperture B is constant, which is why images taken at different camera distances $l_{K1}$-$l_{K3}$ are necessary. For the capturing of the image, a feature $M_i$ must be illuminated with bright, homogeneous, monochromatic light. Should the lighting not be even, several images may be captured and the average value formed thereafter. Theoretically, it would also be possible to calculate the parameters $\alpha_i$ from three pixel intensities $l_1$-$l_3$ with known radii $r_1$-$r_3$ from the main point C and the pixel intensity $l_C$ at the main point C. Since, because of this, small errors may have a significant influence on the result, the correction is performed, as in the present case, preferably by means of a strongly overdetermined system of equations.

The individual correction models of the various aberrations described may be stored separately, for example in the computing unit 5 of the camera 2, or joined and stored as a total correction model in the computing unit 5. This mainly depends on the specific configuration of the computing unit 5 and of the implementation, which is preferably in the form of suitable software.

Each correction of an aberration depends on the modifiable camera settings. The correction parameters $K_i$, $r_i$, $t_i$, $\alpha_i$ determined at a specific camera setting with defined setting specifications are therefore only valid for precisely this combination of camera setting and setting specification. If a single set of correction parameters $K_i$, $r_i$, $t_i$, $\alpha_i$ were used for all other setting specifications of one or more camera settings, this would lead to extreme aberrations. The camera distance $l_K$ is, as already mentioned, not a modifiable camera setting in the context of the invention because it has no influence on the aberration. The modification of the camera distance $l_K$ in the determination of the correction model is still preferable, however, to obtain a correction model that makes it possible to capture sharp images with the camera 2 in addition to the correction of the aberration.

Since it is impossible, however, to determine the correction parameter $K_i$, $r_i$, $t_i$, $\alpha_i$ for each setting specification of each camera setting and optionally for each possible camera distance $l_K$, or since this would be associated with an unreasonably high expenditure of time, the correction parameters $K_i$, $r_i$, $t_i$, $\alpha_i$ for a deviating setting specification of a camera setting and optionally for a camera distance $l_K$ deviating from the chosen camera distances $l_K$ is calculated from the previously determined correction parameters $K_i$, $r_i$, $t_i$, $\alpha_i$. Preferably, the determined correction parameters $K_i$, $r_i$, $t_i$, $\alpha_i$ for the chosen setting specifications and optionally for the chosen camera distances $l_K$ are stored in the computing unit 5 of the camera 2, for example when the camera 2 is manufactured in the context of a manufacturing process and/or during a calibration that follows the manufacturing process. When the camera 2 is used, for example by a user, the correction parameters required for the correction of an aberration at a specific setting specification of a camera setting are calculated by the computing unit 5 from the stored correction parameters $K_i$, $r_i$, $t_i$, $\alpha_i$.

An interpolation is preferably used for the calculation of the correction parameters, whereby the correction parameters are preferably determined by means of a hyperbolic function $$y = \frac{a}{x} + b$$

and a linear interpolation $y=b_1*x+b_0$ from the stored correction parameters $K_i$, $r_i$, $t_i$, $\alpha_i$. If more than two points are available in an area to be linearly interpolated, it is preferable to determine a line by means of linear regression. The linear regression differs from the linear interpolation in that the line is arranged in such a way that an error (generally the method of the sum of the smallest squares of the normal distances) is minimized. Preferably, the hyperbolic function is used for the focal width f; linear interpolation is used for all other parameters.

It should be noted as well, however, that not all cameras 2, especially camera lenses 7, act in the same fashion. Some lenses 7 may have a significantly different behavior in the closer focal area than in the further area. Every model of a lens 7 should therefore be examined for this behavior in the intended working area to design the interpolation ranges that are used in a sensible manner.

The method according to the invention for the development of the correction model was explained in the example shown with the help of two modifiable camera settings (wavelength $\lambda$, focal distance F) and three camera distances $l_K$, but obviously more or less modifiable camera settings and camera distances $l_K$ may be used. If, for example, the aperture B were to be used as an additional modifiable camera setting, at least two different setting specifications would have to be used for the aperture B (different aperture openings) and for each setting specification of the two other modifiable camera settings (wavelength λ, focal distance F) and the chosen camera distances $l_K$, an image of feature $M_i$ arranged on the calibration plate would have to be captured. In the case of two modifiable camera settings with three setting specifications and three camera distances $l_K$ each, this would mean 27 images of the calibration plate, as described, with the features M arranged on it, and in the case of three modifiable camera settings and three camera distances $l_K$ 81 images, etc. In general, the number b of the images is $b=s^K \cdot L$, $s \in \mathbb{Z} >1$, $K \in \mathbb{Z}$, $L \in \mathbb{Z}$, whereby K is the number of the modifiable camera settings (e.g., focal distance F, aperture B, etc.), s is the number of setting specifications, and L the number of camera distances $l_K$. As already described, at least two setting specifications are used, whereby three setting specifications (s=3) have been found to be advantageous. The minimum number $b_{min}$ of images is therefore two, i.e., with only one modifiable camera setting (K=1), two setting specifications (s=2), and one camera distance (L=1).

Figure 4:
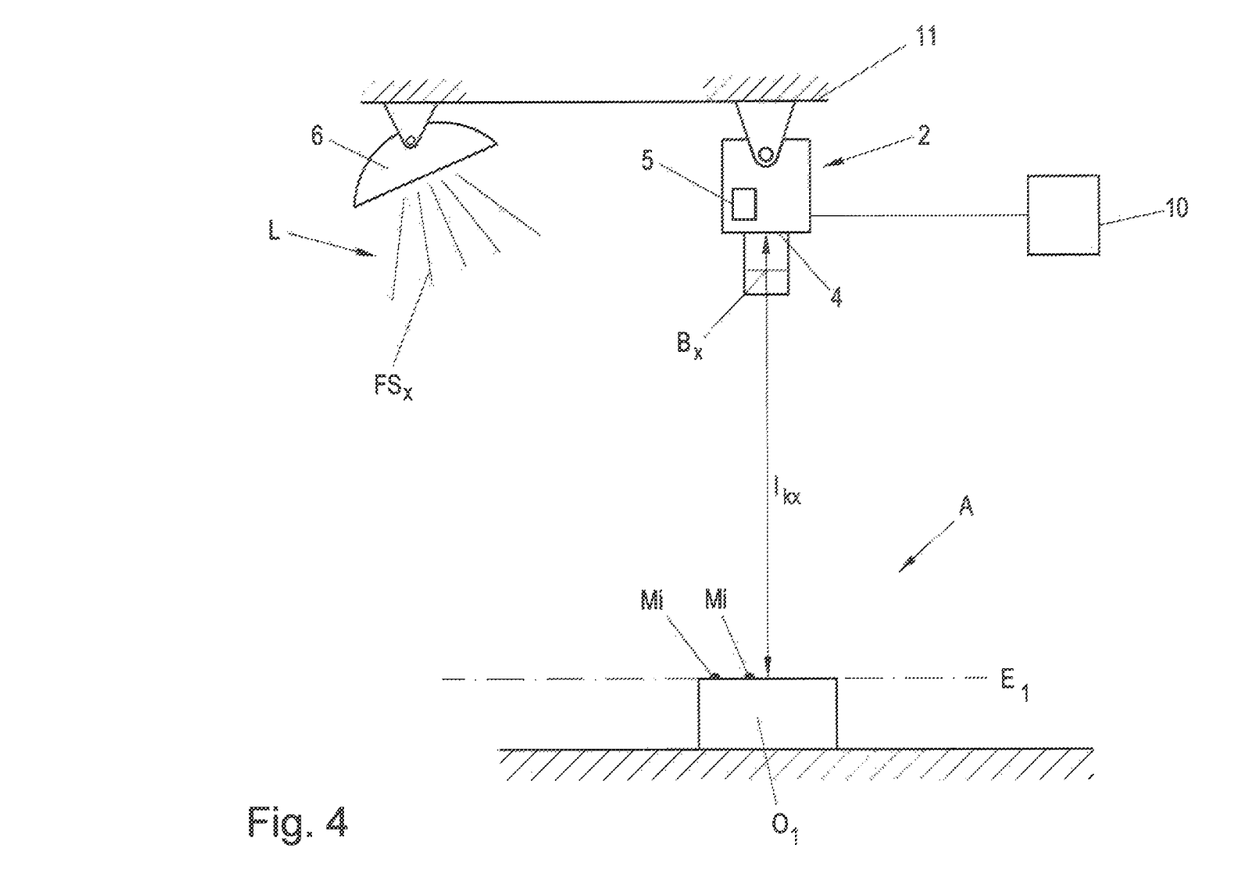
FIG. 4 shows the use of a correction model for the correction of aberrations of a camera.

FIG. 4 shows an example in which a correction model is used for the correction of aberrations when using a camera 2 which was first calibrated.

FIG. 4 shows an industrial image processing system 1 for the measuring of features Mi in a measuring plane $E_1$ of an object $O_1$. A camera 2 with an adjustable aperture B has a stationary arrangement in space, for example on a room ceiling 11 or on another suitable retention means. The camera 2 is arranged above the object $O_1$ so that the measuring plane $E_1$ with the features $M_i$ that are located in it and that are to be measured lie in the capture range A of the camera 2. The image plane 4 of the camera 2 is located at a certain known camera distance $l_{Kx}$ from the measuring plane $E_1$ of the object $O_1$ and preferably oriented parallel to the measuring plane $E_1$. A lighting unit 6 illuminates the capture area A with a light L, which has a known wavelength $λ_x$. A specific aperture $B_x$ is chosen as the aperture setting. A correction model for the correction of aberrations is stored in a storage unit 5 of the camera 2 which was previously generated by means of the method according to the invention, for example in the context of a calibration during the manufacturing of the camera 2.

In the specific example, it is assumed that the correction mode was generated, as described, for a modifiable camera distance $l_K$, a modifiable aperture B, and light L with a modifiable wavelength λ, for example with a calibration plate with fifty features $M_i$ and three setting specifications of the aperture $B_1$-$B_3$ each and the wavelength $λ_1$-$λ_3$ as well as three camera distances $l_{K1}$-$l_{K3}$. The setting specifications (values of the aperture $B_x$, the focal distance $F_x$, and of the camera distance $l_{Kx}$) of the application shown in FIG. 4 differs from the setting specifications ($B_1$-$B_3$, $λ_1$-$λ_3$, $l_{K1}$-$l_{K3}$) of the calibration now; i.e., they substantially have a value that lies between the setting specifications of the calibration (e.g., $B_1 < B_x < B_3$; $B_2 \neq B_x$).

To correct aberrations that are the result of the setting specifications of the application in FIG. 4 deviating from the setting specifications of the calibration, the correction parameters of the correction model stored in the camera 2 are quickly and easily adapted. This is done, for example, in the computing unit 5 of the camera 2, but could also be performed in an external computing unit. To this purpose, the known setting specifications (in the specific case the wavelength $λ_x$ and the aperture $B_x$) as well as the camera distance $l_{Kx}$ are transmitted to the computing unit 5, for example by means of a suitable interface 10. The computing unit 5 then calculates the correction parameters of the correction model for the new setting specifications (wavelength $λ_x$ and the aperture $B_x$) as well as the camera distance $l_{Kx}$ based on the correction parameters that were determined in the context of the calibration. As described, this calculation is preferably performed by means of a hyperbolic function, linear interpolation, or linear regression from the known correction parameters.

This way, the industrial image processing system 1 can quickly and easily be adapted to changing overall conditions. When, for example, the setting of the aperture B changes in the application in FIG. 4, it is not necessary to recalibrate the camera 2 again, as this would be the case in prior art systems, but the new setting of the aperture B is transmitted to the computing unit 5 of the camera 2 by means of the interface 11 and the computing unit 5 calculates the respective correction parameters of the correction model.

What is claimed:

1. A method for the generation of a correction model of a camera to correct at least one aberration influenced by a number of selected, modifiable camera settings in an image plane of the camera, comprising:
    providing for each of the selected, modifiable camera settings that influence the aberration, at least two defined setting specifications for the modification of the respective camera setting,
    capturing with the camera for each of the at least two defined setting specifications, a plurality of features with different known feature positions in space,
    determining image positions of the plurality of features in the image plane from the captured features,
    using at least one known mathematical method to determine a connection between the different known feature positions in space and the corresponding image positions in the image plane of the camera,
    for each of the at least two defined setting specifications of the selected modifiable camera settings, determining correction parameters at least of one specified mathematical correction model for the correction of the at least one aberration, and
    storing the at least one correction model in the camera together with the determined correction parameters.

2. The method according to claim 1, wherein the at least one aberration comprises at least one of a geometric distortion and/or a chromatic aberration and/or a vignetting.

3. The method according to claim 1, wherein the modifiable camera settings that influence the aberration comprise at least one of a focal width and/or a focal distance and/or an aperture and/or a wavelength of a light for the illumination of the features.

4. The method according to claim 1, wherein an equal camera distance from the image plane is provided for all of the plurality of features.

5. The method according to claim 4, wherein the plurality of features are arranged on a two-dimensional calibration plate as active or passive features.

6. The method according to claim 5, wherein the camera distance is modified at least twice, whereby at each camera distance the plurality of features for each of the at least two provided setting specifications are captured by the camera.

7. The method according to claim 1, wherein at least two features with a different camera distance are provided.

8. The method according to claim 7, wherein the plurality of features are arranged on a three-dimensional calibration object as active or passive features.

9. The method according to claim 1, wherein the plurality of features comprises at least ten features.

10. The method according to claim 1, wherein, a pinhole camera model according to Hartley and Zisserman is used as the mathematical method for the determination of the connection between the different known feature positions in space and the image positions in the image plane of the camera.

11. The method according to claim 2, wherein, a radial-tangential model according to Brown-Conrady is used as the correction model for the geometric distortion and/or the chromatic aberration.

12. The method according to claim 2, wherein, a radial vignetting function with vignetting parameters and a pixel intensity is used as the correction model for the vignetting.

13. A method for correction of at least one aberration in an image plane of a camera with a plurality of selected camera settings that influence the at least one aberration, in which a correction model of a camera to correct at least one aberration influenced by a number of selected, modifiable camera settings in the image plane of the camera is generated according to claim 1, the method comprising:

for a setting specification of one of the selected camera settings influencing the aberration that deviates from the at least two defined setting specifications, calculating the correction parameters of the correction model for the correction of the at least one aberration from the determined correction parameters of the at least two defined setting specifications, storing the calculated correction parameters for the deviating setting specification in the correction model of the camera, and using the correction model with the stored calculated correction parameters to correct the at least one aberration in the image plane of the camera at the deviating setting specification.

14. The method according to claim 13, wherein the correction parameters for the deviating setting specification are calculated from the correction parameters of the at least two defined setting specifications by a hyperbolic function and one of a linear interpolation or a linear regression.

15. The method according to claim 5, wherein the plurality of features comprise circular features.

16. The method according to claim 8, wherein the plurality of features comprise circular features.

17. The method according to claim 1, wherein the plurality of features comprises at least twenty features.

18. The method according to claim 1, wherein the plurality of features comprises at least thirty features.

* * * * *